No. 859,263.

PATENTED JULY 9, 1907.

T. THOMASSEN & G. F. KEIL.
LAWN EDGER AND TRIMMER.
APPLICATION FILED JAN. 4, 1907.

Witnesses.
A. H. Opsahl.
H. D. Kilgore

Inventors.
Thomas Thomassen
Geo. F. Keil.
By their Attorneys:
Williamson Merchant

UNITED STATES PATENT OFFICE.

THOMAS THOMASSEN, OF MINNEAPOLIS, AND GEORGE F. KEIL, OF SHERBURN, MINNESOTA.

LAWN EDGER AND TRIMMER.

No. 859,263.      Specification of Letters Patent.      Patented July 9, 1907.

Application filed January 4, 1907. Serial No. 350,747.

*To all whom it may concern:*

Be it known that we, THOMAS THOMASSEN and GEORGE F. KEIL, citizens of the United States, residing, respectively, at Minneapolis and Sherburn, in the counties of Hennepin and Martin and State of Minnesota, have invented certain new and useful Improvements in Lawn Edgers and Trimmers; and we do hereby declare the following to be a full, clear, and exact description of the invention, such as will enable others skilled in the art to which it appertains to make and use the same.

Our invention has for its object to provide an improved lawn edger or trimmer, and to this end it consists of the novel devices and combinations of devices hereinafter described and defined in the claims.

Lawn edgers or trimmers, as is well known, are used to cut grooves from the sod along the edges of stone, concrete, brick or other walks, to prevent the grass from spreading over onto the walks.

Our improved lawn edger or trimmer is illustrated in the accompanying drawings, wherein like characters indicate like parts throughout the several views.

Figure 1:
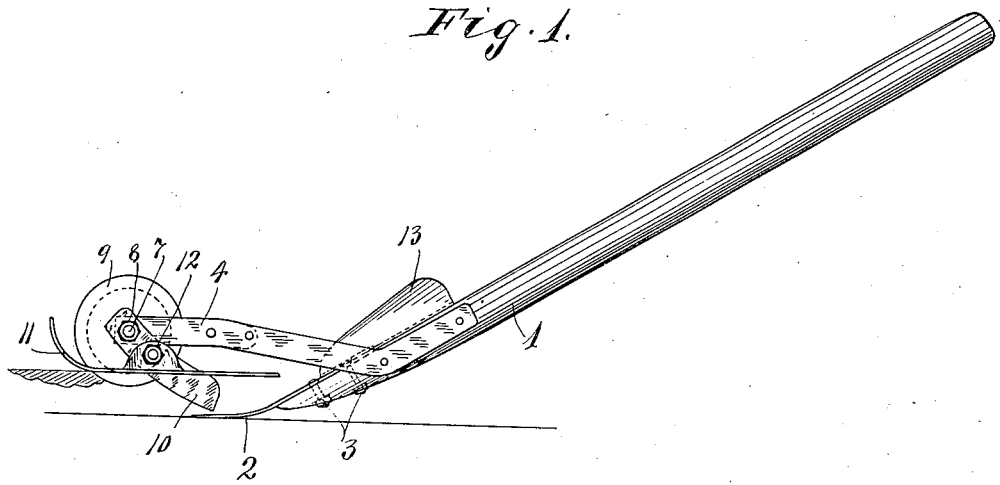
Figure 2:
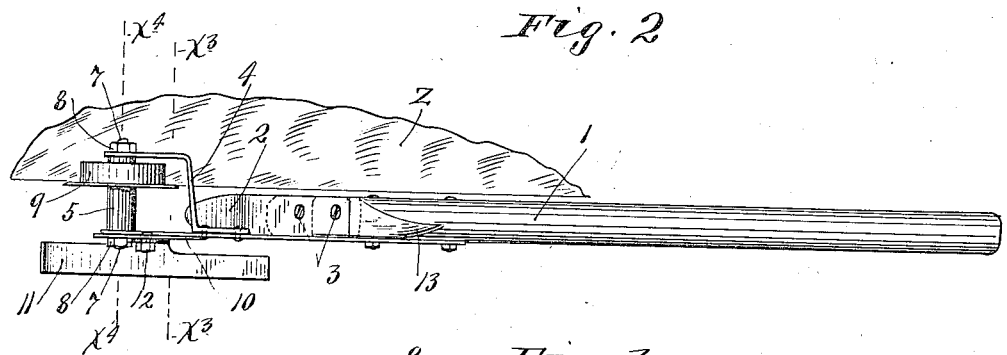
Figure 3:
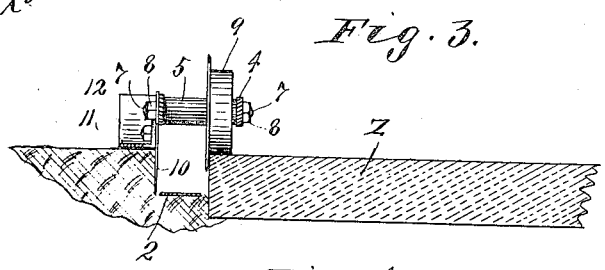
Figure 4:
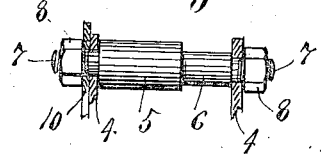

Referring to the drawings, Figure 1 is a view in side elevation, showing the improved device. Fig. 2 is a plan view of the said device. Fig. 3 is a transverse vertical section, taken on the line $x^3$ $x^3$ of Fig. 2; and Fig. 4 is a detail in section taken on the line $x^4$ $x^4$ of Fig. 2, some parts being shown in full.

To the lower end of a push bar 1 an approximately flat but slightly curved plow blade 2 is detachably secured, preferably by short nutted bolts 3. When the handpiece 1 is in the position in which it will be naturally held by a person taking hold of the rear end thereof, the forwardly projecting portion of the plow blade 2 will lie approximately in a horizontal plane, so that it will cut the bottom of the groove from the sod. A pronged or bifurcated bracket 4 is bolted or otherwise rigidly secured to the push bar 1 at its rear end, with its pronged end projecting forward in an approximately horizontal direction. A spindle 5 having a reduced journal 6, threaded trunnions 7 and nuts 8 on said trunnions, connects and is secured to the prongs of the bracket 4. A flanged wheel 9 is mounted on the journal 6 of the spindle 5. The flange of said wheel 9 is at its inner edge, and said flange, as shown, is located in a vertical plane that is slightly outward of the adjacent edge of the plow blade 2. This flanged wheel 9 is adapted to run upon that edge of the walk z which is adjacent to the groove being cut by the edger.

To cut the outer side wall of the groove, a knife blade 10 is provided, which blade is preferably set in an approximately vertical plane and is pivotally connected to the bracket 4, for vertical adjustments, so that the adjustments of the knife may be varied as it wears away, and thereby render the same always operative to cut the wall to the bottom of the groove. This blade 10, as shown, is thus pivotally connected to said bracket, by means of one of the trunnions 7 and nuts 8 of the spindle 5. It is evident that when the left hand nut 8, as shown in Figs. 2 and 3, is tightened, said knife 10 will be clamped against the adjacent prong of the bracket 4 and the said bracket prong will be clamped against the enlarged central portion of said spindle 5, thereby holding the said knife in whatever adjustment it may be set.

A shoe or runner 11 having an up-turned forward end is pivotally attached to the intermediate portion of the knife 10, as shown, by means of a short nutted bolt 12. Secured to the lower end of the push bar 1, just above the upper portion of the plow blade 2, is a mold board 13, the purpose of which will presently appear.

The operation of the device is substantially as follows:
The flanged wheel 9 is placed on the edge of the stone, concrete or other walk, along which the groove is to be cut, the shoe or runner 11 is allowed to rest upon the sod, the plow blade 2 is forced into the ground or sod, and then the entire device is forced forward. When the device is forced forward, the knife 10 cuts the outer wall of the groove, the plow blade 2 cuts the bottom of the groove, and the strip of sod thus cut loose is, by said plow blade, directed upward and against the mold board 13, by which latter the strip of sod is turned laterally over onto the walk and out of the groove from which it was cut. The flanged wheel 9 serves as a gage to limit the width of the groove and to direct the course of the edger with respect to the walk. The shoe 11 prevents the edger from canting over to one side and thus prevents the knife 10 from being thrown too deeply into the ground or out of proper position. The said shoe is pivoted so that it will adapt itself to the ground under different angular positions of the push bar 1.

The device described has been constructed and put into actual use and has been found highly efficient for the purposes had in view. In fact, it has been found that a nicely formed groove may be easily cut by the use of the improved edger, when the said device is pushed forward at the speed of a moderately fast walk. Furthermore, the device may be manufactured at comparatively small cost, is strong and durable, and has no parts that are liable to get out of order. The knife 10 and plow blade 2 will, of course, from time to time require grinding, as they will necessarily be worn away quite rapidly by the sand and gravel through which they are forced in the act of cutting the grooves.

What we claim is:

1. In a lawn edger, the combination with a suitable support, of a plow blade having an approximately horizontally disposed forward cutting edge adapted to cut the bottom of a groove, a flanged wheel journaled to said support and adapted to run upon the edge of a walk, and an upright knife also secured to said support and arranged to cut the outer wall of the groove, substantially as described.

2. In a lawn edger, the combination with a suitable support, of a plow blade having an inclined body portion and an approximately horizontal cutting edge adapted to cut the bottom of a groove, a flanged wheel journaled to said support and adapted to run upon the edge of a walk, an upright knife secured to said support and adapted to cut the outer wall of a groove, and a shoe carried by said support and adapted to run upon the sod and support that side of the device which is opposite to said flanged wheel, substantially as described.

3. In a lawn edger, the combination with a push bar, of a plow blade rigidly but detachably secured to said push bar and provided with a cutting edge adapted to cut the bottom of a groove, a mold board secured to said push bar above said plow blade, a supporting bracket secured to said push bar, a flanged wheel journaled to said bracket and adapted to run upon the edge of a walk, a knife adjustably secured to said supporting bracket and adapted to cut the outer wall of the groove, and a shoe pivoted to said knife and adapted to run upon the sod and support that side of said bracket to which said adjustable knife is attached, substantially as described.

In testimony whereof we affix our signatures in presence of two witnesses.

THOMAS THOMASSEN.
GEORGE F. KEIL.

Witnesses:
MALIE HOEL,
F. D. MERCHANT.